United States Patent

[11] 3,574,458

[72] Inventor Hollis Edward French
North Chelmsford, Mass.

[21] Appl. No. 719,656
[22] Filed Apr. 8, 1968
[45] Patented Apr. 13, 1971
[73] Assignee Itek Corporation
Lexington, Mass.

[54] APPARATUS AND METHOD FOR MODIFYING CONTRAST IN PHOTOGRAPHIC IMAGES
22 Claims, 6 Drawing Figs.

[52] U.S. Cl. .......... 355/80, 355/71, 96/1.5
[51] Int. Cl. .......... G03b 27/76
[50] Field of Search .......... 355/3; 355/80, 81, 71; 96/27, 69

[56] References Cited
UNITED STATES PATENTS

| | | | |
|---|---|---|---|
| 3,166,998 | 1/1965 | Watson | 355/80 |
| 3,332,332 | 7/1967 | Blain et al. | 355/80 |
| 3,355,290 | 11/1967 | Robillard | 96/1.5 |
| 3,393,617 | 7/1968 | Gaynor | 355/3 |

*Primary Examiner*—John M. Horan
*Assistant Examiner*—T. A. Mauro
*Attorneys*—Homer O. Blair, Robert L. Nathans, Lester S. Grodberg and Joseph S. Iandiorio

ABSTRACT: Apparatus is disclosed for exposing a control material with radiation through an image-bearing transparency to vary the impedance of the control material in a pattern in proportion to the density of the image borne by the transparency. Applied across the control material and an electroluminescent material is an electric field which varies at the electroluminescent material as a function of the impedance pattern of the control material. And means are provided for exposing through the transparency a photosensitive medium with actinic radiation produced by the electroluminescent material whose intensity varies as a function of the electric field applied to it in a pattern proportional to the density distribution of the image borne by the transparency.

INVENTOR.
HOLLIS EDWARD FRENCH

BY

Joseph S. Iandiorio

ATTORNEY.

APPARATUS AND METHOD FOR MODIFYING CONTRAST IN PHOTOGRAPHIC IMAGES

The invention is characterized in apparatus for modifying the contrast of a photographic image during printing comprising a control material whose impedance varies in proportion to the intensity of applied radiation in particular frequency ranges, first means for exposing the control material to radiation in a particular frequency range through an image-bearing transparency to vary the impedance of the control material in a pattern corresponding to the density distribution of the image borne by the transparency, an electroluminescent material for providing a source of radiation in a first frequency range as a function of an electric field applied to it, means for applying across the electroluminescent material and the control material an electric field which varies at the electroluminescent material as a function of the impedance pattern of the control material to expose a photosensitive medium through the transparency to radiation whose intensity in the first frequency range, emitted by the electroluminescent material, varies in a pattern proportional to the density distribution of the image borne by the transparency.

BACKGROUND OF THE INVENTION

This invention relates to a method and apparatus for modifying the contrast of photographic images during printing and more particularly to dodging, decreasing contrast, and enhancing, increasing contrast, of photographic images.

Dodging, decreasing the contrast of photographic images, is a process in which the density levels of the original film transparency are effectively compressed into the range of sensitivity of the emulsion on the photosensitive medium which is exposed through the transparency to produce a photographic print or reproduction. Typically, the transparency is an original negative and dodging may be accomplished by inserting a positive mask of the original negative between the exposing light source and the original negative. The positive mask attenuates the light directed toward the less dense areas of the original negative to a greater degree than it attenuates the light directed toward the more dense areas of the original negative. The result is a print having greater clarity of detail because the exposure levels are within the most sensitive and substantially linear portion of the sensitivity curve, i.e., the density vs log of exposure (D-Log E) curve, of the emulsion of the photosensitive medium.

Dodging may also be accomplished by using a phosphor quenching technique in which ultraviolet light is used to excite a fluorescent surface to produce actinic light to expose a photosensitive medium. A source of near infrared light directed through the negative quenches the surface and attenuates the actinic light output of the surface in inverse proportion to the density of the negative: areas of the surface shielded from the near infrared light by high density portions of the negative receive less quenching near infrared light and produce more actinic light while areas of the surface shielded by low-density portions of the negative receive more quenching near infrared light and produce less actinic light.

Image enhancing is a process in which the intensity of the exposure radiation passing through low-density areas of the negative is increased and the intensity of the exposure radiation passing through high-density areas of the negative is decreased to increase the contrast of the images.

In many cases important information is derivable from the underexposed or shadow areas or photographic images but is lost because of the poor contrast available at low exposure levels of the film. These underexposed or shadow areas which appear as dark areas on the positive photograph and in the originally photographed scene appear as light or low-density areas on the negative film. The lighter or less dense areas of the negative lie on a nonlinear portion of the characteristic curve of the film. The characteristic curve is a plot of density vs logarithm of exposure (D-Log E) where the density is the ordinate and the log of the exposure the abscissa. Both the density and log of exposure increase as distance from the origin increases in such a plot, but for the first part of that curve the density does not increase linearly compared to the log exposure value, and in the initial stages of that first part, where exposure is low, only small differences in density are observable for relatively substantial differences in exposure. The result is that information in this area is usually indiscernible because of the lack of contrast. Image enhancement is an attempt to render such information more discernible by increasing the contrast of the image.

SUMMARY OF THE INVENTION

Thus, it is desirable to have available a new method and means capable of modifying the contrast of photographic images.

It is also desirable to have available such method and means capable of increasing or decreasing the contrast of photographic images.

It is also desirable to have available such method and means for applying the density distribution pattern of the image to establish a corresponding pattern in impedance variation in a control material which is used to provide final print exposure radiation in a pattern whose intensity varies directly or inversely proportionally to the density distribution pattern of the image.

It is also desirable to have available such method and means wherein the final print exposure radiation varies in direct proportion to the density of the image and may be used for dodging.

It is also desirable to have available such method and means wherein the final print exposure radiation varies in inverse proportion to the density of the image and may be used for image enhancing.

The invention may be accomplished by apparatus for exposing a control material, whose impedance varies in proportion to the intensity of applied radiation in particular frequency ranges, to radiation in a particular frequency range through an image-bearing transparency to vary the impedance of the control material in a pattern corresponding to the density distribution of the image borne by the transparency. Applied across the control material and an electroluminescent material is an electric field which varies at the electroluminescent material as a function of the impedance pattern of the control material. A photosensitive medium is exposed through the transparency to radiation in a first frequency range, emitted by the electroluminescent material when subject to an electric field, in a pattern whose intensity varies in proportion to the density distribution of the image borne by the transparency.

DISCLOSURE OF SPECIFIC EMBODIMENTS

Other objects, features and advantages will appear from the following description of preferred embodiments of the invention and the accompanying drawings, in which.

Figure 4:
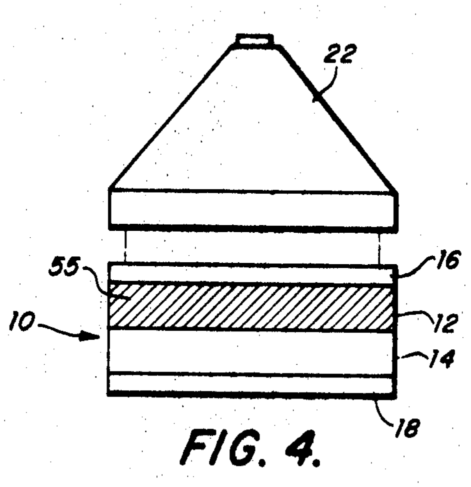
Figure 5:
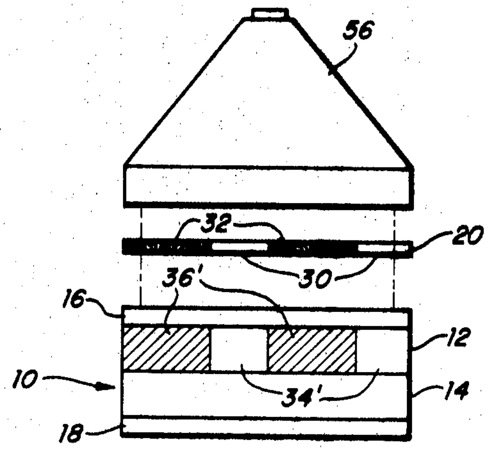
Figure 6:
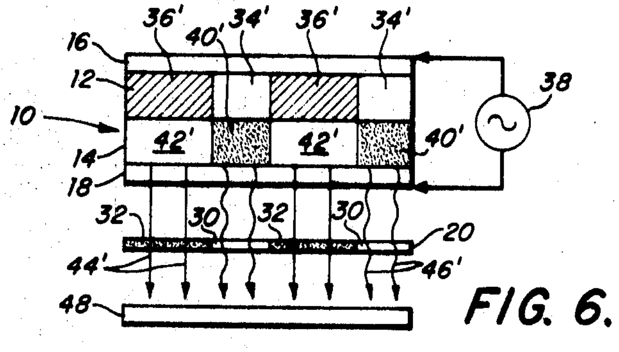

FIG. 4 s is a diagrammatic side view of an arrangement for providing a uniform reduction of impedance of the control layer of the element;

FIG. 5 is a diagrammatic side view of an arrangement for imposing a pattern corresponding to the pattern of a transparency on the reduced impedance of the control layer;

FIG. 6 is a diagrammatic side view of an arrangement for providing dodging of a photograph printed from the transparency which established the impedance pattern in the element of FIG. 5 using the element of FIG. 5.

In one embodiment of the invention a control layer, having variable impedance and positioned between an electrode and an interfaced electroluminescent layer which has a second electrode on its other side, is exposed to collimated radiation such as ultraviolet radiation through a negative transparency having an image desired to be enhanced. The ultraviolet exposure establishes a pattern of impedance variations in the control layer corresponding to the density variations of the transparency. An electric field is applied across the electrodes. The field will be strongest across the electroluminescent layer where the impedance of the control layer has been decreased most by having been subject to high intensity ultraviolet radiation. And the field will be weakest across the electroluminescent layer where the impedance of the control layer has been minimally decreased by having been subject to low intensity ultraviolet radiation. The intensity of the ultraviolet radiation incident in the control layer varies directly as the density of the transparency through which it was projected.

The electric field causes the electroluminescent layer to emit actinic light whose intensity varies in direct proportion to the intensity of the ultraviolet radiation which established the pattern in the control layer and in inverse proportion to the density of the transparency and the impedance of the control layer. The electrode associated with the control layer is transparent to ultraviolet radiation and the electrode associated with the electroluminescent layer is transparent to the actinic light emitted.

A photosensitive medium is exposed through the transparency to the actinic light emitted from the electroluminescent surface. As a result the photosensitive medium will receive more light through the less dense and less light through the more dense portions of the transparency and the final print of the image on the photosensitive medium is enhanced. The photosensitive medium may be positioned between the radiation source and transparency so that it is exposed by the radiation emitted by the electroluminescent layer through the translucent control layer. Or the photosensitive medium may be positioned adjacent the electroluminescent layer with the transparency between them so that the photosensitive medium is exposed directly by the radiation emitted by the electroluminescent layer.

Figure 1:
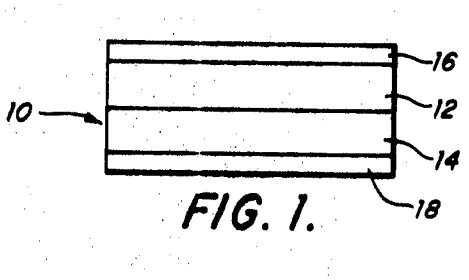
FIG. 1 is a diagrammatic side view of an element having control and electroluminescent layers usable according to this invention.
Figure 2:
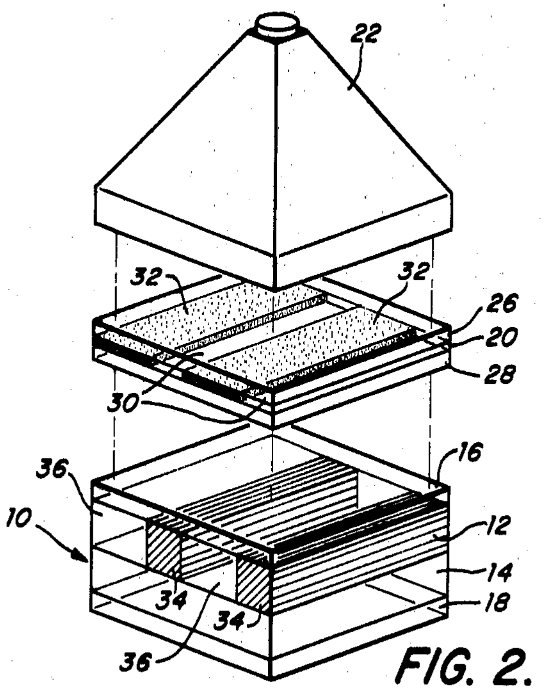
FIG. 2 is a diagrammatic perspective view showing an arrangement for establishing an impedance pattern, which corresponds to a pattern on a transparency, in the control layer of the element of FIG. 1.

An element 10, FIG. 1, may be formed of a control layer 12 an an interfaced electroluminescent layer 14 between plate electrodes 16 and 18. For purposes of image enhancement a transparency 20, FIG. 2, is supported between a source 22 of collimated ultraviolet radiation and element 10, by means of transparent glass plates 26 and 28.

Source 22 irradiates transparency 20 uniformly over its entire area, but since the density of the transparency is not uniform, the ultraviolet light passing through transparency 20 is not uniform. Rather it is nonuniform in intensity and the intensity varies indirectly as the density of the transparency: more ultraviolet light passes through the less dense area 30 of the transparency 20 and less light passes through the more dense areas 32 of the transparency 20.

Control layer 12 is a suitable material whose impedance varies inversely with the intensity of the ultraviolet light incident on it. That is, the impedance is decreased by exposure to ultraviolet light. Therefore the more intense ultraviolet light coming from the less dense areas 30 of transparency 20 passes through electrode 16 and reduces the impedance of sections 34 in layer 12, while little or no ultraviolet light passes through the more dense areas 32 of transparency 20 and sections 36 remain at substantially the normal impedance of layer 12. The impedance patterns thus stored in layer 12 may persist for one or more hours.

Figure 3:
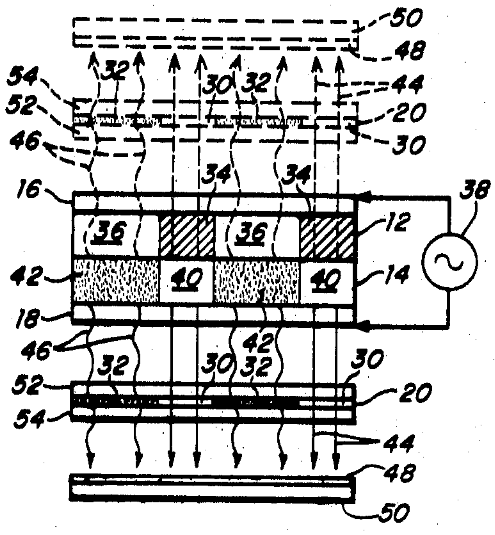
FIG. 3 is a diagrammatic side view of an arrangement for providing image enhancement of a photograph printed from the transparency which established the impedance pattern in the element of FIG. 2 using the element of FIG. 2.

An alternating current energy source 38 may be applied across electrodes 16 and 18, FIG. 3, to create a field across layers 12 and 14. Between electrodes 16 and 18 the voltage is equal and the field is equal. But, because of the variations of the impedance of layer 12 caused by the ultraviolet light incident on that layer in a pattern corresponding to the density of transparency 20, the voltage and the field across the sections 34 of reduced impedance are diminished. Thus, the adjacent segments 40 of electroluminescent layer 14 are subject to a portion of the voltage and field between electrodes 16 and 18. And the voltage and field across the sections 36 of normal impedance are undiminished so that adjacent segments 42 of electroluminescent layer 14 receive a lesser portion of the total field and voltage between electrodes 16 and 18 than do segments 40. The control layer 12 is, in effect, acting as a voltage divider: the percentage of the voltage or field allotted to electroluminescent layer 14 is dependent upon the amount of reduction of the impedance of control layer 12.

The actinic light emitted from layer 14 is at higher intensity, arrows 44, in the ares of segments 40 and at lower intensity, arrows 46, in the areas of segments 42. Thus, the intensity pattern of the emitted light is inversely proportional to the density pattern of transparency 20 and the light having this pattern of intensity which inversely corresponds to the pattern of density of transparency 20 is well suited for enhancing the image of a print made from transparency 20.

The stronger light through the less dense areas 30 increases the contrast of those areas on the final print by exposing those areas to the print at an exposure level which is higher than they normally would have been exposed at, and which exposure level is within the linear region of the D vs. log E curve.

The final print may be made with image enhancement by supporting a photosensitive medium 48 on a transparent glass plate 50 and exposing it to the light emitted from electroluminescent layer 14 through transparency 20 supported by transparent glass plates 52 and 54. Transparency 20 and medium 48 may be arranged either adjacent the electroluminescent layer 14 as shown in full lines in FIG. 3 or adjacent the control layer 12 as shown in dashed lines in FIG. 3. In the latter arrangement the radiation emitted from layer 14 passes through translucent layer 12 to expose medium 48.

In a similar manner dodging may be accomplished by first uniformly exposing element 10, FIG. 4, to ultraviolet light, for example by means of source 22, so that the impedance of every part of control layer 12 is uniformly reduced: the entire control layer 12 is a reduced impedance section 55.

The element 10 is then exposed to a quenching radiation which may be collimated infrared radiation from source 56, FIG. 5. Sources 22 and 56 may as well be contained in a single source. Source 56 irradiates transparency 20 uniformly over its entire area, but since the density of the transparency is not uniform the infrared light coming through it is not uniform: it has an intensity which varies indirectly as the density of the transparency.

Infrared irradiation of control layer 12 restores or raises the impedance of any areas of that layer which are at a reduced impedance. Therefore the more intense infrared light coming from the less dense areas 30 of transparency 20 passes through electrode 16 and increases the impedance of sections 34′, i.e., diminishes the impedance-reducing effect of the previously applied ultraviolet light, while little or no infrared passes through the more dense areas 32 of transparency 20, so that sections 36′ remain at substantially the same reduce impedance level previously created by the uniform exposure to ultraviolet light.

Alternating current energy source 38 may be applied across electrodes 16 and 18, FIG. 6, to create a field across layers 12 and 14. But because of the variations of the impedance layer 12 caused by the pattern of infrared light imposed on layer 12 after it had had its impedance uniformly reduced, the voltage and field across sections 36′ of reduced impedance are diminished and thus the adjacent segments 42′ of electroluminescent layer 14 are subject to a greater portion of the voltage and field between electrodes 16 and 18. And the voltage and field across the sections 34' of raised or restored impedance are undiminished so that adjacent segments 40' of electroluminescent layer 14 receive a lesser portion of the total field and voltage between electrodes 16 and 18 than do segments 42'. The actinic light emitted from layer 14 is at higher intensity, arrows 44', in the areas of segments 42' and lower intensity, arrows 46', in the areas of segments 40'. Thus, the intensity pattern of the emitted light is directly proportional to the density pattern of transparency 20, and the light having this pattern of intensity, which directly corresponds to the pattern of density of the transparency, is well suited for dodging the image of a print made from transparency 20.

The stronger light through the more dense areas 32 decreases the brightness of those areas on the final print by exposing them to the print at a higher exposure level, and the less light through the less dense areas 30 decreases the darkness of those areas on the final print by exposing those areas to the print at a lower exposure level. The result is that the bright and dark extremes of exposure are attenuated and the print is compressed toward the more linear or gray region of the D log E curve. The transparency 20 and photosensitive medium may be arranged on either side of element 10.

Various materials may be used as a control layer and various types of radiation may be used to lower the impedance and restore the impedance of the control layer depending upon its composition. A typical control layer may be formed of zinc oxide and a paraffin binder; a typical electroluminescent layer may be formed of copper doped zinc sulfide; and the photosensitive medium may be visible light sensitive photographic paper or orthochromatic or panchromatic film. Control layers may also be formed of certain types of photochromic materials which exhibit an increase in impedance upon exposure to ultraviolet and a decrease upon exposure to visible light. The arrangements of the control layer, electroluminescent layer, transparency, and impedance-reducing and restoring radiation sources may take many forms. For example: the control and electroluminescent layers need not be in physical contact as long as the impedance variation effect is used to influence the applied electric field; the transparency may be a portion of a film strip supported by rollers or the like, and the glass plates may be eliminated or substituted for; similarly the photosensitive medium may be a portion of a larger film strip; the impedance-reducing and/or restoring radiation source may provide only a narrow slit of radiation and/or be but a narrow section of material; one or more of the transparency, source, and control layer may be moved relative to each other in a direction transverse to the slit of radiation; similarly the electroluminescent layer may provide only a narrow slit of actinic light and/or be but a narrow section of material. Collimated radiation is not required if the components are arranged in intimate contact.

Other embodiments will occur to those skilled in the art and are within the following claims:

I claim:

1. Apparatus for modifying the contrast of a photographic image during printing comprising:

a control material whose impedance varies in proportion to the intensity of applied radiation in particular frequency ranges;

first means for exposing said control material to radiation in a particular frequency range through an image-bearing transparency to vary the impedance of said control material in a pattern corresponding to the density distribution of the image borne by said transparency;

an electroluminescent material for providing a source of radiation in a first frequency range as a function of an electric field applied to it; and means for applying, across said electroluminescent material and said control material, in an electric field which varies at said electroluminescent material as a function of the impedance pattern of said control material to expose a photosensitive medium through said transparency to the radiation whose intensity in said first frequency range, emitted by said electroluminescent material, varies in proportion to the density distribution of the image borne by said transparency.

2. The apparatus of claim 1 in which said first means for exposing includes a second source of radiant energy for exposing said control material through said transparency with radiation in a second frequency range to vary the impedance of said control material in direct proportion to the density of said transparency.

3. The apparatus of claim 1 in which said first means for exposing includes a second source of radiant energy for uniformly exposing said control material with radiation in a second frequency range to uniformly decrease the impedance of said control material, and a third source of radiant energy for exposing said control material, having uniformly decreased impedance, through said transparency with radiation in a third frequency range to vary the impedance of said control material in inverse proportion to the density of said transparency.

4. The apparatus of claim 1 in which said first means for exposing includes a radiation source and first support means for positioning said transparency between said control material and said radiation source.

5. The apparatus of claim 1 in which said means for applying an electric field includes:

a first electrode connected to said control material and a second electrode connected to said electroluminescent material, said first electrode being transparent to radiation applied to said control material by said first means for exposing and said second electrode being transparent to radiation generated by said electroluminescent material; and a source of electrical energy for providing a voltage across said electrodes.

6. The apparatus of claim 5 in which said source of electrical energy provides alternating current.

7. The apparatus of claim 1 in which said electroluminescent material and said control material have an interface.

8. The apparatus of claim 1 in which said radiation in said first frequency range emitted by said electroluminescent material includes actinic light in the visible range.

9. The apparatus of claim 2 in which said second frequency range includes radiation in the ultraviolet range.

10. The apparatus of claim 3 in which said radiation in said second frequency range includes radiation in the ultraviolet range and said radiation in the third frequency range includes radiation in the infrared range.

11. The apparatus of claim 1 in which said first means for exposing includes means for simultaneously exposing said control material to the entire pattern of radiation established by the image borne by said transparency.

12. The apparatus of claim 1 in which said first means for exposing said transparency and said control material are fixed relative to each other during exposure of said control material.

13. The apparatus of claim 1 in which said control material, said electroluminescent material, said transparency, and said photosensitive medium are fixed relative to each other during exposure of said photosensitive medium.

14. Apparatus for modifying the contrast of a photographic image during printing, comprising:

a control material whose impedance decreases in proportion to the intensity of ultraviolet radiation applied to it;

an ultraviolet radiation source;

means for supporting an image-bearing transparency between said control material and said ultraviolet source to vary the impedance of said control material in direct proportion to the density distribution of the image borne by said transparency;

an electroluminescent material for providing a source of actinic radiation whose intensity varies in direct proportion to the intensity of an applied electric field, said electroluminescent material having an interface with said control material;

a first electrode connected to the external face of said control material, and a second electrode connected to the external face of said electroluminescent material; and a source of electric energy, connected in series with said first electrode, said control material, said electroluminescent material, and said second electrode, to produce at said electroluminescent material an electric field which varies in proportion to the impedance pattern of said control material, to expose said photosensitive medium through said transparency to said actinic radiation, produced by said electroluminescent material, whose intensity varies in proportion to the density distribution of the image borne by said transparency.

15. Apparatus for modifying the contrast of a photographic image during printing, comprising:

a control material whose impedance decreases in proportion to the intensity of ultraviolet radiation applied to it and whose impedance, when so decreased, may be increased by application of infrared radiation;

an ultraviolet radiation source for uniformly exposing said control material to uniformly decrease its impedance;

an infrared radiation source;

means for supporting an image-bearing transparency between said control material and said ultraviolet source to vary the impedance of said control material in direct proportion to the density distribution of the image borne by said transparency;

an electroluminescent material for providing a source of actinic radiation whose intensity varies in direct proportion to the intensity of an applied electric field, said electroluminescent material having an interface with said control material;

a first electrode connected to the external face of said control material, and a second electrode connected to the external face of said electroluminescent material;

a source of electric energy, connected in series with said first electrode, said control material, said electroluminescent material, and said second electrode, to produce at said electroluminescent material an electric field which varies in proportion to the impedance pattern of said control material, to expose said photosensitive medium through said transparency to said actinic radiation, produced by a said electroluminescent material, whose intensity varies in proportion to the density distribution of the image borne by said transparency.

16. A method of modifying the contrast of a photographic image during printing comprising:

exposing a control material, whose impedance varies in proportion to the intensity of applied radiation in particular frequency ranges, to radiation in a particular frequency range through an image-bearing transparency to vary the impedance of said control material in a pattern corresponding to the density distribution of the image borne by said transparency;

applying, across said control material and an electroluminescent material, an electric field which varies, at the electroluminescent material, as a function of the impedance pattern of said control material; and exposing a photosensitive medium through said transparency to radiation in a first frequency range, emitted by said electroluminescent material when subject to an electric field, in a pattern whose intensity varies in proportion to the density distribution of the image borne by said transparency.

17. The method of claim 16 in which said control material is exposed with radiation in a second frequency range to vary its impedance in direct proportion to the density of said transparency.

18. The method of claim 16 further including uniformly exposing said control material with radiation in a second frequency range to uniformly decrease the impedance of the control material, and then exposing said control material, having uniformly decreased impedance, through said transparency with radiation in a third frequency range to vary the impedance of said control material in inverse proportion to the density of said transparency.

19. The method of claim 17 in which said radiation in said second frequency ranges includes radiation in the ultraviolet range.

20. The method of claim 18 in which said radiation in said second frequency range includes radiation in the ultraviolet range and said radiation in said third frequency range includes radiation in the infrared range.

21. The method of claim 16 in which said transparency and said control material are fixed relative to each other during exposure of said control material.

22. The method of claim 16 in which said control material, said electroluminescent material, said transparency, and said photosensitive medium are fixed relative to each other during exposure of said photosensitive medium.